(12) United States Patent
Crotaz

(10) Patent No.: US 11,129,699 B2
(45) Date of Patent: Sep. 28, 2021

(54) DENTAL TREATMENT INSTRUMENTS

(71) Applicant: BONOVATE LIMITED, Surrey (GB)

(72) Inventor: Ivan Robert Crotaz, Berkshire (GB)

(73) Assignee: BONOVATE LIMITED, Surrey (GB)

( * ) Notice: Subject to any disclaimer, the term of this patent is extended or adjusted under 35 U.S.C. 154(b) by 108 days.

(21) Appl. No.: 16/491,418

(22) PCT Filed: Mar. 13, 2018

(86) PCT No.: PCT/GB2018/000037
§ 371 (c)(1),
(2) Date: Sep. 5, 2019

(87) PCT Pub. No.: WO2018/234726
PCT Pub. Date: Dec. 27, 2018

(65) Prior Publication Data
US 2020/0015950 A1   Jan. 16, 2020

(30) Foreign Application Priority Data

Mar. 13, 2017   (GB) ...................... 1703951

(51) Int. Cl.
*A61D 1/00*    (2006.01)
*A61D 5/00*    (2006.01)
*A61C 1/14*    (2006.01)
*A61C 3/02*    (2006.01)

(52) U.S. Cl.
CPC .................. *A61D 5/00* (2013.01); *A61C 1/14* (2013.01); *A61C 3/02* (2013.01)

(58) Field of Classification Search
CPC .... A61C 1/14; A61C 3/00; A61C 3/02; A61C 3/08; B25G 1/102; B25G 1/105; B25G 3/26; A61D 5/00
See application file for complete search history.

(56) References Cited

U.S. PATENT DOCUMENTS

| | | | |
|---|---|---|---|
| 2,366,671 A | 1/1945 | Montelius | |
| 3,430,345 A * | 3/1969 | Abreu ....................... | A61C 3/00 433/144 |
| 3,646,679 A * | 3/1972 | Naugle .................... | A61C 3/14 433/1 |
| 2005/0136377 A1 * | 6/2005 | Corti ................... | A61B 17/1604 433/144 |
| 2013/0171581 A1 | 7/2013 | McCafferty et al. | |

(Continued)

FOREIGN PATENT DOCUMENTS

| | | |
|---|---|---|
| CN | 2143482 Y | 10/1993 |
| DE | 19616349 A1 | 11/1997 |

(Continued)

OTHER PUBLICATIONS

International Search Report dated Jul. 30, 2018; International Applicaiton No. PCT/GB2018/000037.

(Continued)

*Primary Examiner* — Heidi M Eide
(74) *Attorney, Agent, or Firm* — Dinsmore & Shohl LLP

(57) ABSTRACT

A dental instrument is configured to reduce user discomfort and increase control over the surgical edge of the instrument. The invention further discloses a dental instrument having a replaceable blade.

16 Claims, 5 Drawing Sheets

(56) References Cited

U.S. PATENT DOCUMENTS

| | | | |
|---|---|---|---|
| 2014/0065572 A1* | 3/2014 | Thai | A61C 3/00 433/147 |
| 2014/0316395 A1* | 10/2014 | Shurgalin | A61B 18/22 606/13 |
| 2016/0361078 A1 | 12/2016 | Pagliacci et al. | |

FOREIGN PATENT DOCUMENTS

| | | |
|---|---|---|
| DE | 19616352 A1 | 11/1997 |
| FR | 2613213 A1 | 10/1988 |
| GB | 622940 A | 5/1949 |
| GB | 856965 A | 12/1960 |
| GB | 2019723 A | 11/1979 |
| KR | 20100129007 A | 12/2010 |
| KR | 20150004066 U | 11/2015 |
| WO | 2015127543 A1 | 9/2015 |

OTHER PUBLICATIONS

United Kingdom Search Report dated Jul. 25, 2017; Application No. GB 1703951.2.
United Kingdom Search Report dated Sep. 3, 2018; Application No. GB1803886.9.
European Exam Report for EP Application No. 18 714 007.4 dated Feb. 5, 2021.

\* cited by examiner

DENTAL TREATMENT INSTRUMENTS

CROSS-REFERENCE TO RELATED APPLICATIONS

This application is the U.S. national stage of PCT/GB2018/000037 filed Mar. 13, 2018, which claims priority of United Kingdom Patent Application 1703951.2 filed Mar. 13, 2017 of which both are hereby incorporated by reference in their entirety.

FIELD OF INVENTION

This invention relates to dental treatment instruments and, in particular though not necessarily solely, to instruments for use in veterinary dental procedures.

BACKGROUND OF THE INVENTION

Veterinary dental procedures comprise a significant part of veterinary practice, and often involve tooth extraction. A variety of instruments are provided for this purpose. One type of instrument is used to cut down into the space between the tooth and the tooth socket using a gentle pushing and/or rocking action. A second instrument is then placed into the cut space and gently twisted to lever the tooth up and out of the tooth socket. These instruments include blades of different configurations to improve function and efficiency.

Whatever the function, existing veterinarian dental instruments comprise a shaft fixed in an ovoid or screwdriver-type handle, the shaft having a shaped and sharpened tip to perform the procedures described above. The instruments are available in a variety of sizes and tip configurations so that different species and breeds of animal, with teeth of different sizes and root diameter, can be treated safely and effectively.

There are a number of significant problems with the design and use of current instruments.

Firstly, existing instruments are often sold in sets and these sets are not inexpensive. Depending on the veterinary practice some instruments in the set 25 will be used more than others and there is a temptation to use an instrument that is not best matched to the task if the available set does not include an instrument better suited to the task; or if the instrument that is better suited is blunt or damaged.

Secondly, the most common forms of dental instrument have a long handle which is designed so that the fingers wrap around the axis of the handle and the blade protrudes out some distance from the fingers. This arrangement means that it is difficult to exert fine control over the cutting edge of the blade, particularly given that the instrument is being used in a slippery environment. Any slip means that the blade can penetrate tissue until it is stopped either by 10 the finger of the surgeon or until the blade penetrates to its full depth and is stopped by the handle. As a result, soft tissue injuries including eye punctures are reported as complications arising from veterinary dental surgery and, as a consequence, dental experts recommend that the surgeon's index finger should be extended down the blade to rest against the back of the blade tip. This stabilises the blade tip and prevents slip but makes it difficult to grip the instrument. Stubby handles have been developed to reduce the problem but they are, in essence, cut-down versions of the traditional instruments.

The handles of existing instruments, whether in traditional or stubby form, have substantially flat gripping surfaces aligned along, or substantially along, the longitudinal axis of the instrument. Substantial extension and locking of the wrist and fingers is required to grip the instrument sufficiently firmly to apply torsion to the tooth, particularly if the index finger is positioned to support the blade tip. Further, use of the instrument requires the surgeon to flex the fingers hard to force the instrument against the palm in order to maintain grip. Given that dental procedures can typically last for one to three hours, use of existing instruments can result in considerable discomfort and hand fatigue, the latter being more likely to result in accidental injury to the patient or to the surgeon.

A further problem with existing instruments is that the blade or tip of the instrument is placed into a very narrow space between bone and enamel, both of which are very hard biological materials. The instrument is then pushed and twisted further into that space, the result being that the cutting edge rapidly becomes dull and damaged, and can also deform. Blunt misshapen instruments require greater force to use and create a greater risk of slippage and tissue damage. Further, extraction takes longer than is the case when using a sharp instrument. Despite these problems, few veterinary practices have the facilities and expertise to sharpen the blades, and cost mitigates against disposal and replacement.

It is an object of the invention to provide an instrument and/or components therefor which will go at least some way to addressing one or more of the aforementioned shortcomings; or which will at least offer a novel and useful choice.

SUMMARY OF THE INVENTION

Accordingly, in a first aspect, the invention provides a handle for a dental instrument, said handle having a mass; a proximal end; a distal end; and a longitudinal axis extending between a proximal end and a distal end, said proximal end being defined, at least in part, by a convex arcuate surface, said handle being characterised in that the greater part of said mass is concentrated closer to said proximal end than to said distal end.

Preferably, when viewed in a plane extending through said longitudinal axis, the radius of said arcuate surface is substantially equal to or greater than the radius of any other surface in said plane.

Preferably said handle further includes at least one finger grip defined in part by a surface extending parallel to said longitudinal axis when viewed in said plane but having a radius less than the radius of said arcuate surface.

Preferably said at least one finger grip is, at least in part, defined by a surface extending away from said longitudinal axis.

Preferably said handle includes a plurality of finger grips, spaced along said longitudinal axis.

Preferably each grip is defined, at least in part, by a surface extending parallel to said longitudinal axis, the diameter of successive surfaces reducing in the direction from said proximal end to said distal end.

Preferably said handle is symmetrical about said longitudinal axis.

Preferably said handle includes a bore there-through, said bore being aligned with and centred about said longitudinal axis.

Preferably said bore terminates in a socket at said distal end.

Preferably a step is defined between said bore and said socket.

In a second aspect the invention provides a functional fitting to perform a dental procedure, said fitting comprising a shaft having a distal end configured to preform said procedure and a proximal end comprising a mounting part for removable engagement with a handle, said mounting part having a first facility 20 to locate said fitting against rotation with respect to said handle and a second facility to locate said fitting against longitudinal sliding movement with respect to said handle.

Preferably said functional fitting is defined in part by a shaft, said first facility comprising a non-circular surface formation formed integrally with said shaft.

Preferably said non-circular formation comprises a square or hexagonal section.

Preferably said second facility comprises a step formed on said shaft.

Preferably said step is located at one end of said square or hexagonal section.

Preferably said functional fitting further includes a fastening section extending from said square or hexagonal section at the end thereof opposite to said step.

Preferably said fastening section comprises a threaded spigot.

In a third aspect the invention provides a dental instrument comprising a functional fitting as set forth above; and a handle having a longitudinal axis, said fitting including a shaft projecting from said handle along said longitudinal axis.

Preferably said functional fitting is removably engageable with said handle.

Preferably the distal end of said functional fitting extends from the distal end of said handle a distance lying in the range 3 to 6 cm.

In a fourth aspect the invention provides a dental instrument comprising a handle as set forth above, a functional fitting projecting from said distal end of said handle and aligned substantially with said longitudinal axis; and a locking facility to lock said functional fitting within said handle.

Preferably said functional fitting is as set forth above.

In a fifth aspect the invention provides a dental instrument set comprising a handle as set forth above; and a plurality of functional fittings as set forth above, each of said functional fittings being engageable with said handle, at least one of said functional fittings having a distal end configured differently to a distal end of another of said functional fittings.

In a sixth aspect the invention provides a dental treatment instrument comprising a handle having a mass, a proximal end and a distal end; and a functional fitting extending from said distal end, said instrument being characterised in that:

said functional fitting is removably engaged with said handle; said proximal end has a radius equal to or greater than other radii on said handle; and the greater part of said mass is located closer to said proximal end than to said distal end.

Many variations in the way the invention may be performed will present themselves to those skilled in the art, upon reading the following description. The description should not be regarded as limiting but rather as an illustration, only, of one manner of performing the invention. Where appropriate any element or component should be taken as including any or all equivalents thereof whether or not specifically mentioned.

BRIEF DESCRIPTION OF THE DRAWINGS

The invention will now be described with reference to the accompanying drawings in which.

DETAILED DESCRIPTION OF WORKING EMBODIMENTS

Figure 1:
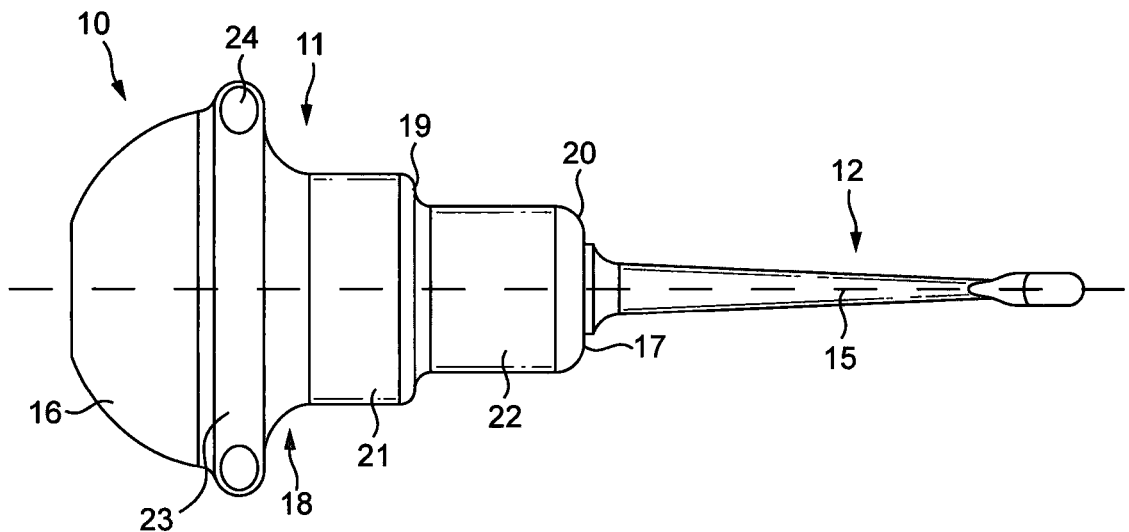
FIG. 1 is a side view of a first embodiment of dental instrument according to the invention.

Referring to FIGS. 1 to 7 of the drawings, the invention provides a first embodiment 10 of dental instrument which has been developed for veterinary use but is not restricted thereto. The instrument 10 exhibits considerable benefits over prior art instruments that will become apparent from the description that follows.

In broad terms the instrument comprises a handle 11, a functional fitting or blade 12, and a locking member 13 to retain the blade 12 within the handle 11.

In a first aspect the invention is directed to the handle 11, the configuration of which will be described with reference to a longitudinal axis 15. In the particular form shown, the handle is longitudinally symmetrical about the axis 15 and the blade 12 extends from the handle along the axis 15. In cross-section, regardless of position along the axis 15, the handle is preferably circular although this is not essential.

The handle is formed from a rigid material such as metal, ceramic or moulded plastics. Aluminium is a suitable metal.

Figure 5:
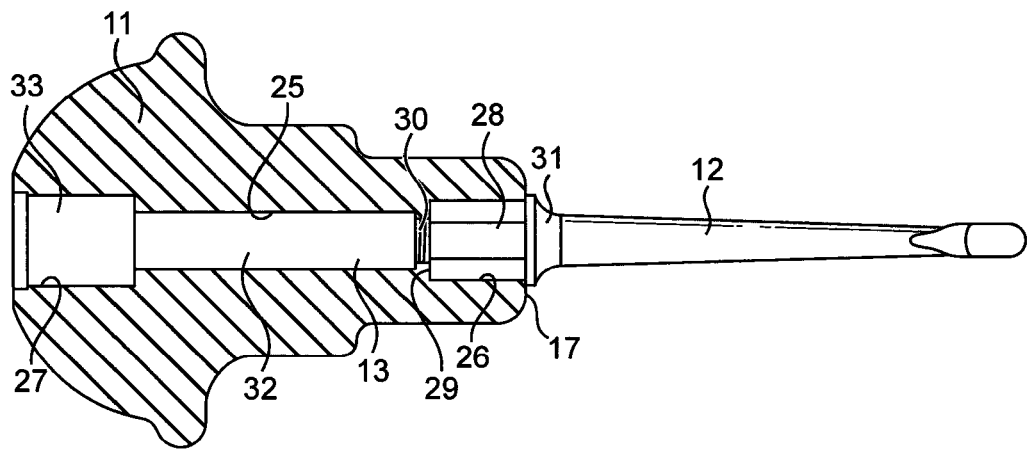
FIG. 5 is a part sectional view through the instrument of FIG. 1 illustrating the fitting and locking member of FIG. 4 held within a handle.
Figure 6:
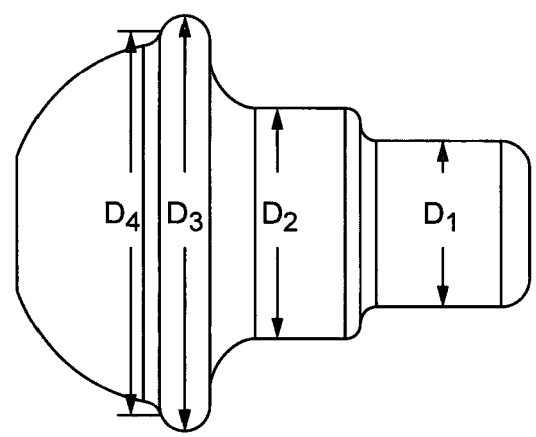
FIG. 6 is an outline of the handle forming part of the instrument of FIG. 1 indicating dimensions that will be described in detail below.

The handle 11 has a proximal end 16 and a distal end 17, the proximal end being defined, at least in part, by a convex arcuate or dome-shaped end surface for reception in the palm of the hand. When viewed in a plane extending through the longitudinal axis 15, as shown in FIG. 5, the radius of the curved surface 16 is equal to or greater than the radius of any other surface of the handle. This means that the end surface 16 can be received comfortably in the palm of the hand and point loadings on the hand, from the instrument, are minimised if not avoided altogether.

A plurality of discreet grips 18, 19 & 20 are spaced at intervals along the axis 15, the grips being defined by changes in diameter of the handle. As a result the individual grips are also arranged at different distances from the longitudinal axis 15, the further the distance along the axis 15, in a direction away from the end surface 16, the closer the grip to the axis 15. Thus the grip 18 is further away from axis 15 than grip 19, while grip 19 is further away from axis 15 than the grip 20. As best seen from FIGS. 1 & 2, the grips are defined by annular steps separated by shaft sections 21 & 22 of the handle body. All corners between annular steps and shaft sections are curved or bevelled to avoid discomfort to the user.

As can be seen, the grip 18 is in part defined by a rim 23 extending around the base of the domed end-section 16. The rim 23 is preferably provided with flats 24 to prevent the instrument from rolling when placed on a flat surface.

The respective diameters and lengths of the shaft sections are set to suit typical hand shapes, and different sizes of handle may be provided to suit larger hands and smaller hands. Further, short and long versions are proposed for surgeons who prefer a longer or shorter handle. Example only data is shown in Table 1 and is to be interpreted with reference to FIG. 6.

TABLE 1

|       | $L_1$ | $L_2$ | $L_3$ | $L_4$ | $D_1$ | $D_2$ | $D_3$ | $D_4$ |
|-------|-------|-------|-------|-------|-------|-------|-------|-------|
| Short | 22 mm | 20 mm | 3 mm  | 23 mm | 20 mm | 28 mm | 50 mm | 45 mm |
| Long  | 22 mm | 27 mm | 3 mm  | 23 mm | 20 mm | 26 mm | 43 mm | 40 mm |

Figure 7A:
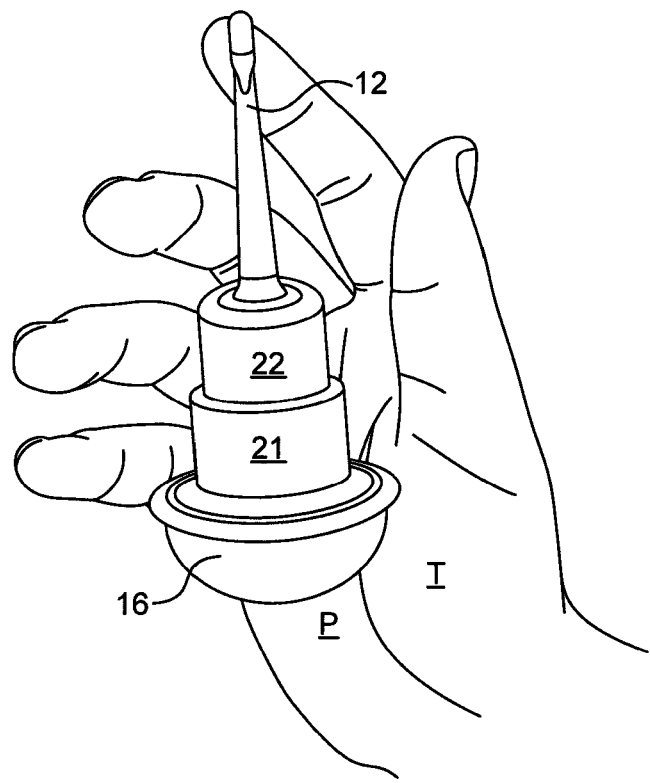
FIGS. 7A & 7B are views of an instrument as shown in the previous Figs held in two typical stages of grip by a user.
Figure 7B:
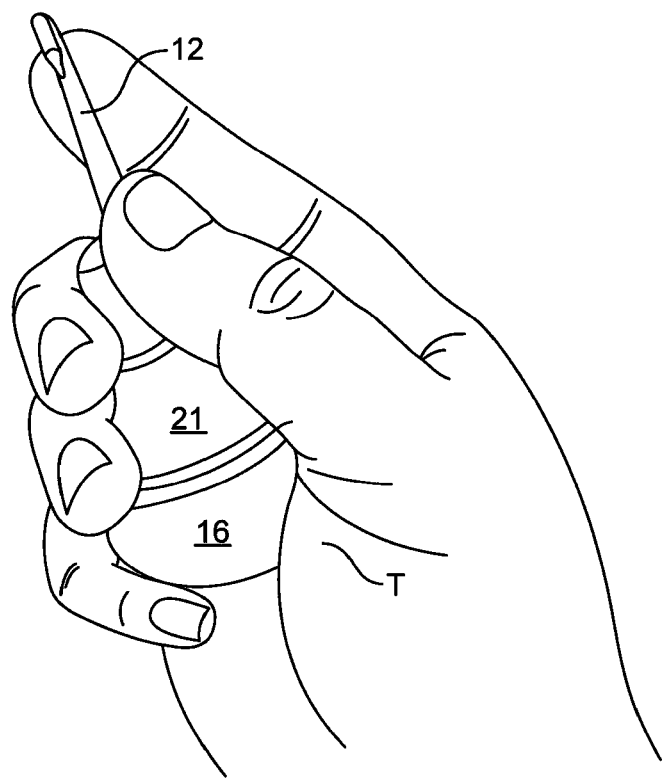

As shown in FIGS. 7A & 7B, in use the instrument is conveniently positioned so that the dome-shaped end section 16 rests in the palm P, against the thenar T, and the index finger positioned along the blade so that the finger tip supports the blade tip. The thumb hooks over the rim 23 and the thumb and middle finger then rest naturally against the grip 19 while the fourth and fifth fingers rest against the grip 18 and the surface 16. This allows the handle to be comfortably wedged into the palm by application of force along the axis 15 and positions the axis of effort along the forearm and through the centre of the wrist. As a result, the wrist does not need to be flexed or extended to any appreciable extent when applying force through the instrument since the rotational force is applied by the forearm muscles.

It will be appreciated that the ability of the surgeon to support the blade tip will be dependant on the length of the blade. The blades may be provided in different lengths to suit the preference of the surgeon but greatest control is achieved over the blade tip when the blade length (from tip to handle) is in the range 3 to 6 cm The grips illustrated in FIGS. 7A & 7B are assisted by the fact that the surface of greatest radius is received in the palm of the hand and the mass of the handle is concentrated toward the proximal end 16, that is to say that, when viewed as in FIG. 5, the greater mass of the handle is concentrated toward the proximal end 16. This feature also assists when the instrument is not being held but is sitting on a surface as the heavier proximal end encourages the distal end 17 to be presented upwardly, making the instrument easier to grasp and position in the hand for use.

Figure 2A:
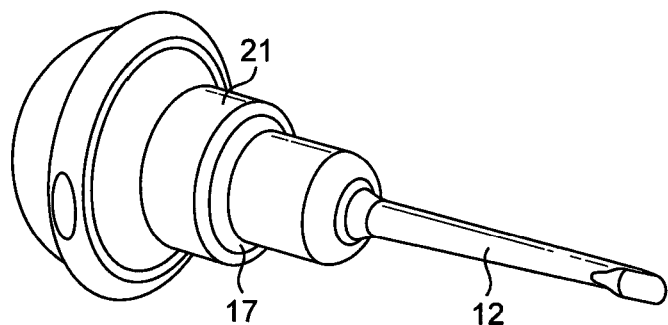
FIGS. 2A & 2B are opposing isometric views of the instrument shown in FIG. 1.
Figure 2B:
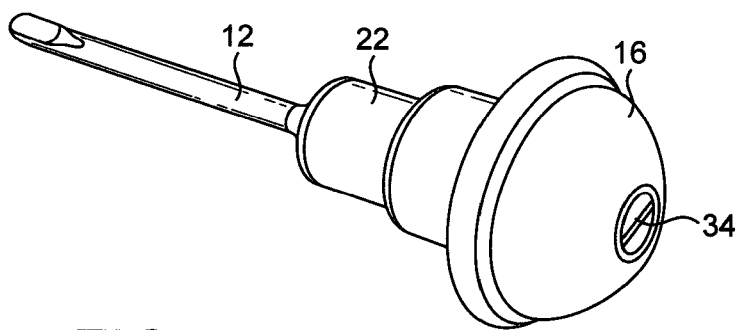

While the instrument shown in FIGS. 1 & 2 could be provided with blade 12 permanently fixed, in another aspect the invention provides for the handle to be offered as one component and the blade to be offered as another component. Thus a variety of blade configurations can be engaged with the one handle enabling a variety of dental procedures to be performed and enabling sharp replacement blades to be used without incurring the cost of replacing the entire instrument.

Figure 3:
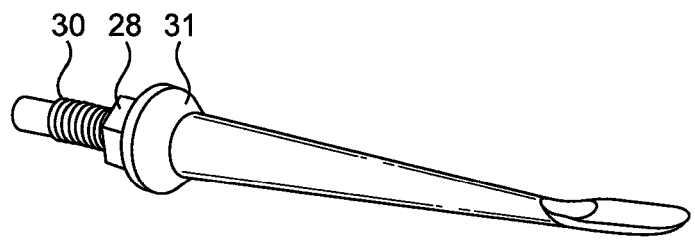
FIG. 3 is an isometric view of a functional fitting or blade forming part of the instrument shown in the preceding drawings.
Figure 4:
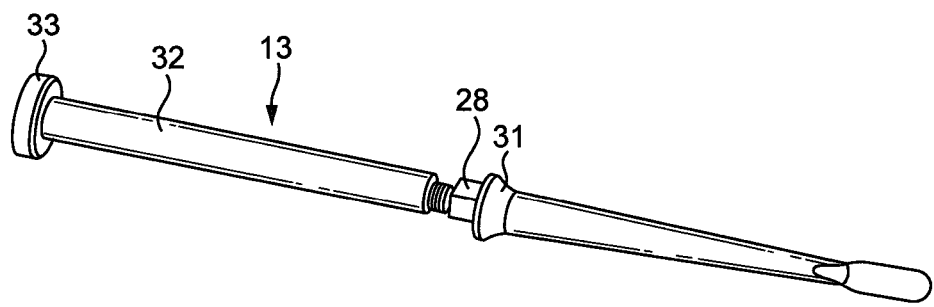
FIG. 4 is an isometric view of the fitting of FIG. 3 combined with a locking member.

With reference to FIGS. 3 to 5, the handle and blade are configured in a manner so that the blade can be firmly retained in the handle against movement both longitudinally and rotationally with respect to axis 15 yet be readily separable when desired.

As shown in FIG. 5, the handle 11 is provided with a cylindrical bore 25 extending along and through the longitudinal axis 15, the bore 25 having a first socket 26 at distal end 17 to receive the blade 12 and a second socket 27 at the proximal end 16 to receive the head of locking component 13. The fitting section of blade 12 comprises a boss 28 shaped to engage a complimentary shaped wall of the socket 26 so that rotation of the blade in the handle is prevented. By way of example both the cross-section of socket 26 and boss 28 may be square or hexagonal. The boss terminates in a step 29 from which extends a threaded section 30 for engagement with the locking component 13. The blade further includes a collar 31 which engages the distal end 17 of the handle.

The locking component 13 comprises a shaft 32 which, in use, is received in bore 25, the distal end of shaft 32 being provided with an internally threaded socket to receive the threaded section 30 of the blade. The inner or proximal end of locking component is provided with a head 33 that is sized for receipt in socket 27 of the handle. The outer face of head 33 may be provided with a slot 34 (FIG. 2B) such that a screw driver or key may be engaged with the component to draw the blade into the socket 26, draw the step 29 of boss 28 against the inner edge 34 of the socket 26, and/or draw the collar 31 against the distal end 17 of the handle.

It will be seen from FIG. 5 that the head 33 of the locking component lies inwardly of surface 16 and the edges of socket 27 are preferably radiused or bevelled to avoid contributing discomfort to the user.

Whilst the above describes one configuration for removably attaching a blade to a handle, it will be appreciated that many other methods could be used without departing from the scope of the invention including (but not restricted to) those relying on friction, magnetic attraction and various forms of clips.

Both handles and blades as above described are preferably formed from materials that can be autoclaved or otherwise sterilised.

Figure 8:
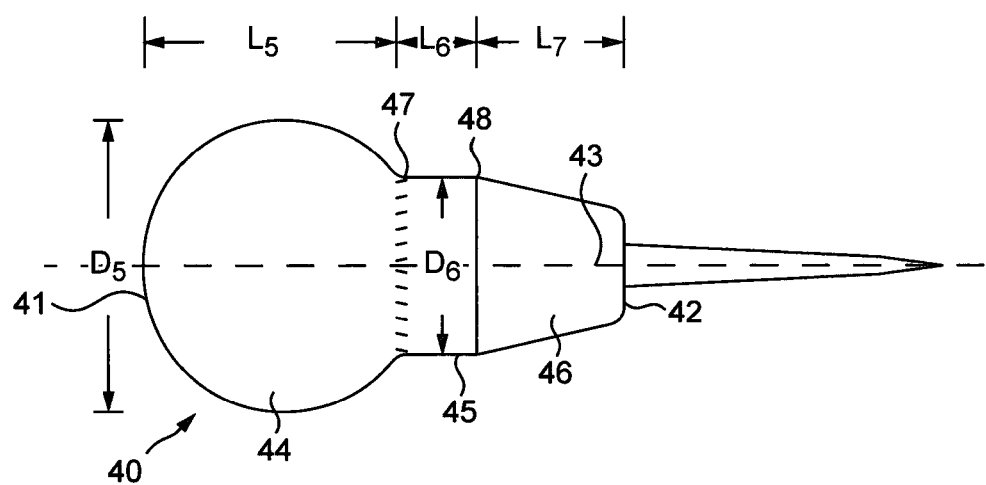
FIG. 8 is a side view of a second embodiment of dental instrument according to the invention.
Figure 9A:
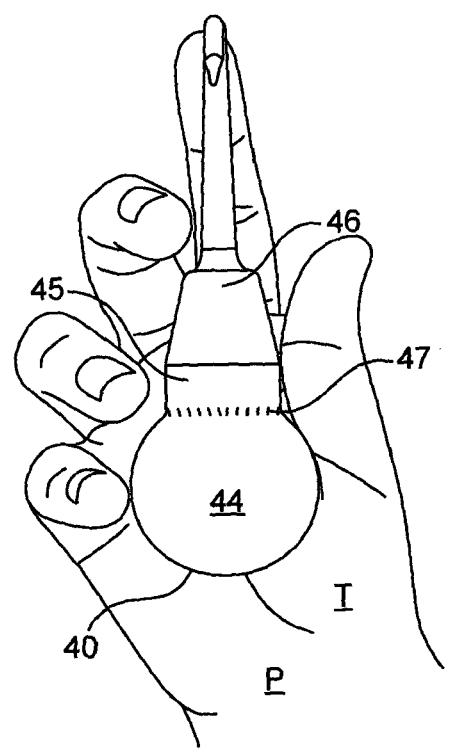
FIGS. 9A & 9B are views of the instrument shown in FIG. 8 held in two typical stages of grip by a user.
Figure 9B:
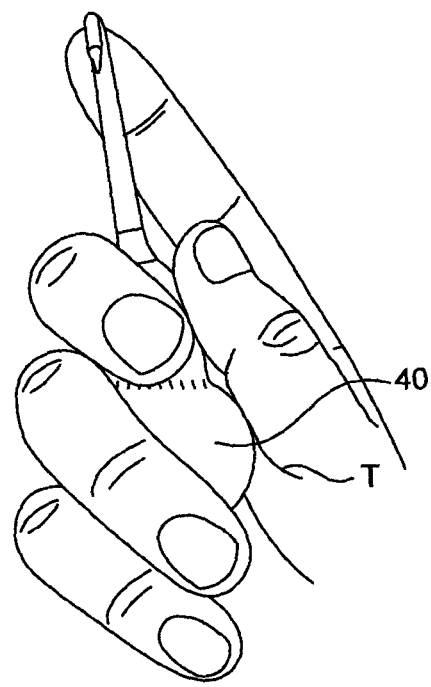

Referring now to FIGS. 8, 9A & 9B, a second embodiment 40 of handle is shown which is somewhat simpler in form to the handle 11 described above, but which shares the same inventive features. To this end handle 40 has a proximal end 41, a distal end 42, and a longitudinal axis 43. The proximal end is defined in part by a convex arcuate or domed-shaped surface which is the surface of maximum diameter and forms part of a ball-like structure 44 that merges into a shaft section 45. The shaft section 45 extends about and along the axis 43 and an inwardly directed tapering section 46 extends between the shaft section 45 and the distal end 42. A grip 47 is defined between the ball-like structure 44 and the shaft section 45 and a further grip 48 may be defined between the sections 45 and 46.

By way of example only, the diameter $D_5$ may be 35 mm and the diameter $D_6$ may be 23 mm. The lengths $L_5$, $L_6$ and $L_7$ may be 30 mm, 12 mm & 24 mm respectively. As with the embodiment described above, the handle and blades are preferably configured so that the distal end of the blade extends about 3 to 6 cm from the distal end of the handle as again, as with the embodiment described above, the greater part of the mass of the handle is concentrated in the ball like structure 44 and toward the proximal end 41.

The handle 40 is also formed from a rigid material such as aluminium, another metal, a ceramic or a moulded plastics.

As shown in FIGS. 9A & 9B, the handle 40 is also placed in the palm P with the ball-like structure being positioned against the thenar T. As the fingers wrap around the handle the middle, ring and small fingers bias the handle against the thumb which exerts the bulk of the gripping action. The thumb joint rests in grip 47 while the distal end of the thumb lies along section 45 and curls over and on to tapering section 46.

The interior of the handle 40 may be configured in exactly the same manner as that described with reference to FIG. 5 so that the handle may also be used with replaceable blades.

It will thus be appreciated that, at least in the case of the operating embodiment described, the invention provides a dental instrument that can be gripped and used comfortably for prolonged periods, and the surgical edges of which can be kept in an optimum condition by simple replacement of the blades.

The invention claimed is:

1. A dental tooth extraction instrument, comprising:
   a handle having a mass, a proximal end, a distal end, at least one finger grip, and a longitudinal axis extending between the proximal end and the distal end, the proximal end being defined, at least in part, by a convex arcuate surface, the at least one finger grip being configured and positioned in relation to the proximal end such that, in use, the arcuate surface is held against a user's palm by finger pressure applied to the at least one finger grip, the handle being further configured such that a greater part of the mass is concentrated closer to the proximal end than to the distal end;
   a functional fitting having a shaft configured to perform a dental extraction detachably engageable with the handle, the functional fitting being configured such that the shaft projects from the handle along the longitudinal axis;
   a locking means configured and operable to lock the functional fitting to the handle; and
   the functional fitting having a length such that, when the functional fitting is engaged with the handle, a distal end of the functional fitting extends from the distal end of the handle by a distance lying in the range of 3 to 6 cm, the handle and the functional fitting length configured such that when the handle is held against the palm by finger pressure applied to the at least one finger grip, an index finger positioned along the functional fitting positions a tip of the index finger proximate to the distal end of the functional fitting to support the distal end.

2. The dental instrument of claim 1, wherein when the handle is viewed in a plane extending through the longitudinal axis, the arcuate surface has a radius that is equal to or greater than a radius of any other surface of the handle in the plane.

3. The dental instrument of claim 2, wherein the at least one finger grip is defined in a first part by a cylindrical surface extending parallel to the longitudinal axis when viewed in the plane, the cylindrical surface having a radius less than the radius of the arcuate surface; and
   the at least one finger grip is defined in a second part by a surface extending away from the longitudinal axis so as to define an annular step.

4. The dental instrument of claim 1, wherein the at least one finger grip comprises a plurality of finger grips spaced along the longitudinal axis.

5. The dental instrument of claim 4, wherein each of the plurality of grips is defined, at least in part, by a cylindrical surface extending parallel to the longitudinal axis, the diameter of successive cylindrical surfaces reducing in the direction from the proximal end to the distal end of the handle.

6. The dental instrument of claim 1, wherein the handle is symmetrical about the longitudinal axis.

7. The dental instrument of claim 1, wherein the handle includes a bore there-through, the bore being aligned with and centred about the longitudinal axis and being configured to receive the locking means.

8. The dental instrument of claim 7, wherein the bore terminates in a socket at the distal end.

9. The dental instrument of claim 8, wherein the functional fitting comprises a mounting part having a first facility to locate the fitting against rotation with respect to the handle and a second facility to locate the fitting against longitudinal sliding movement with respect to the handle.

10. The dental instrument of claim 9, wherein the first facility comprises a non-circular surface formation formed integrally with the shaft of the functional fitting.

11. The dental instrument of claim 10, wherein the non-circular surface formation comprises a square or hexagonal section.

12. The dental instrument of claim 10, wherein the second facility comprises a step formed on the shaft.

13. The dental instrument of claim 12, wherein the step is located at one end of a square or hexagonal section forming the non-circular surface formation.

14. The dental instrument of claim 13, further including a fastening section extending from the square or hexagonal section at the end thereof opposite to the step, the fastening section being engageable with the locking means.

15. The dental instrument of claim 14, wherein the fastening section comprises a threaded spigot.

16. The dental instrument of claim 1, wherein the functional fitting is a blade.

* * * * *